April 7, 1931. E. B. MILLER 1,799,858
METHOD FOR CATALYZING GASEOUS REACTIONS
Filed Feb. 21, 1925 5 Sheets-Sheet 2
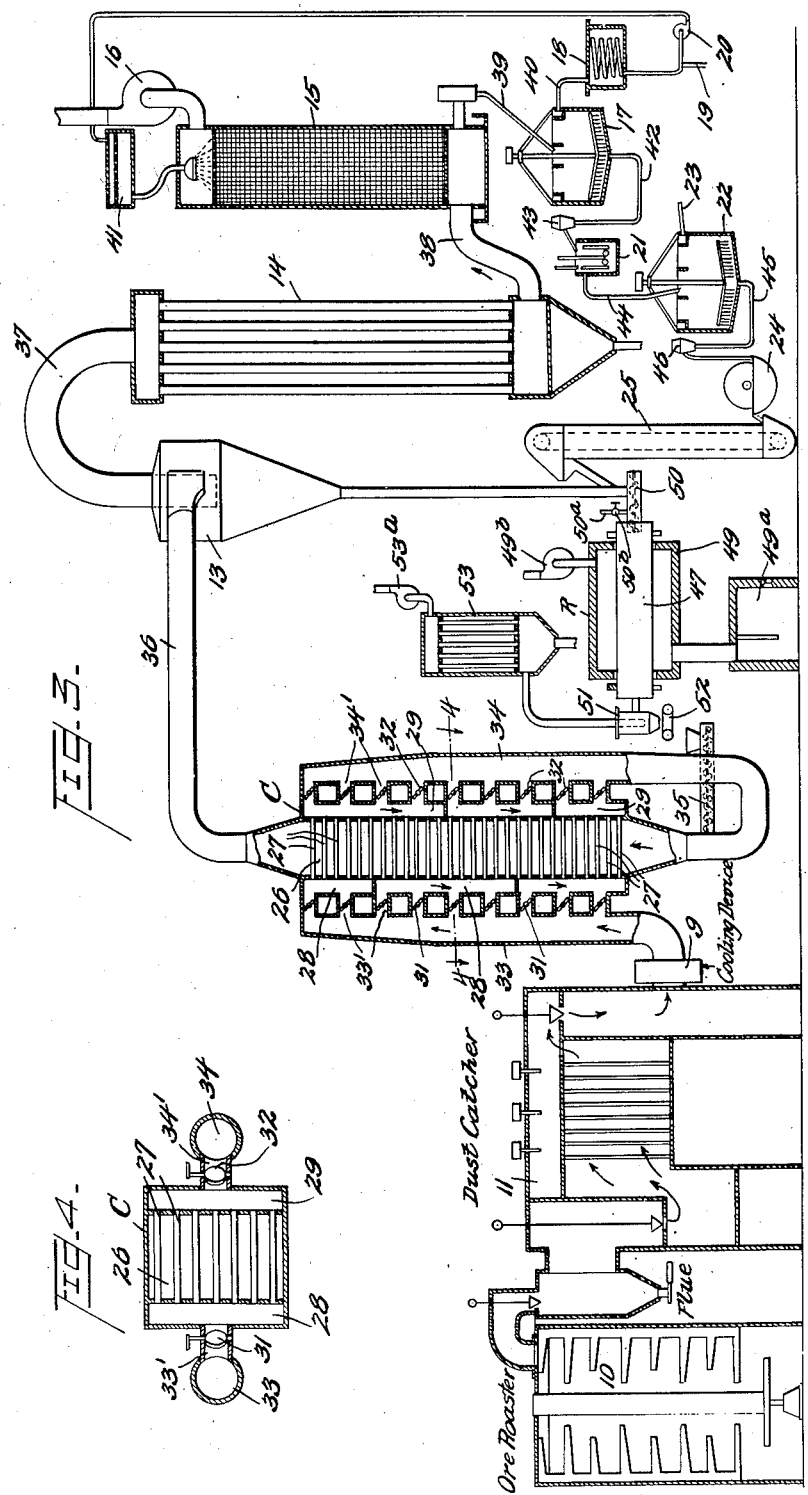

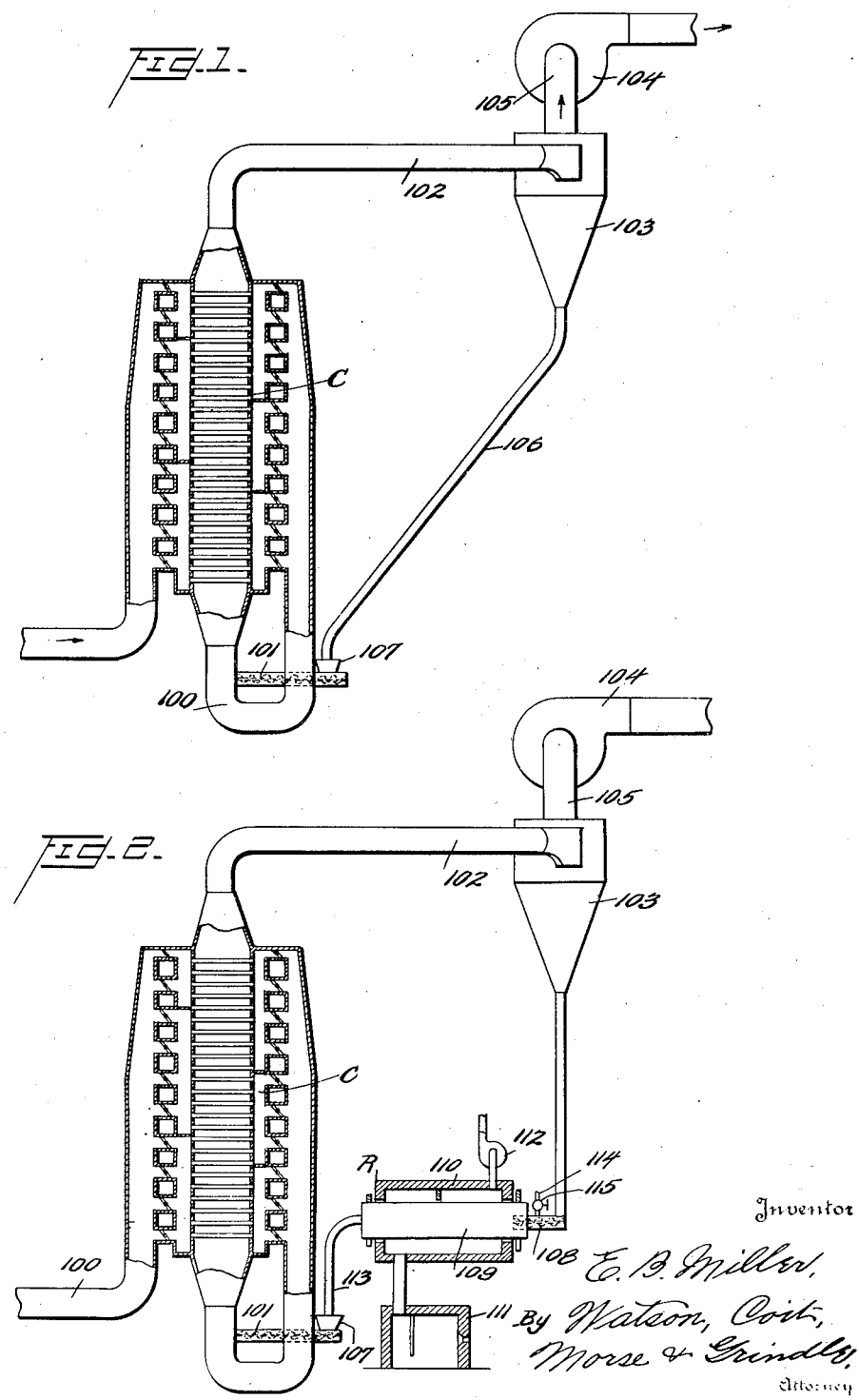

April 7, 1931.  E. B. MILLER  1,799,858
METHOD FOR CATALYZING GASEOUS REACTIONS
Filed Feb. 21, 1925   5 Sheets-Sheet 3
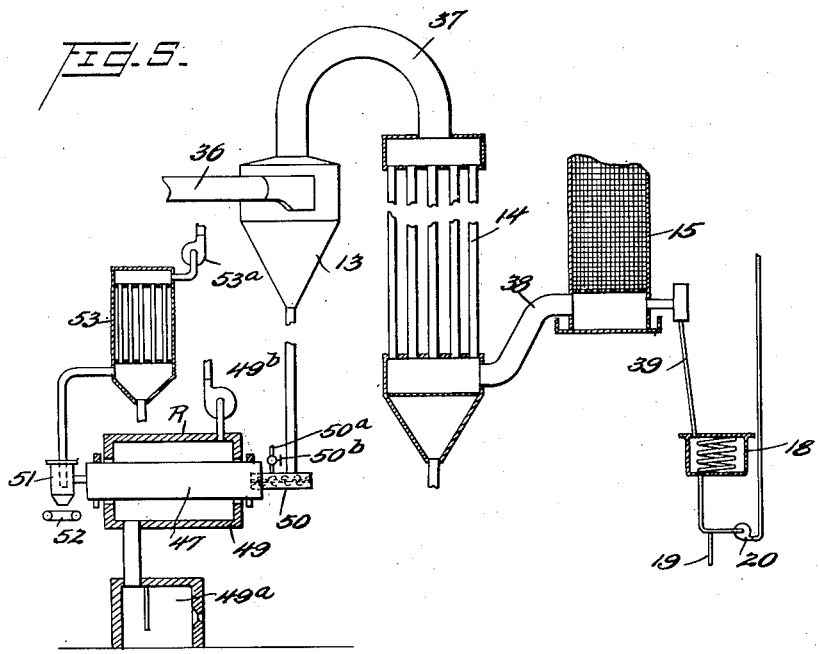
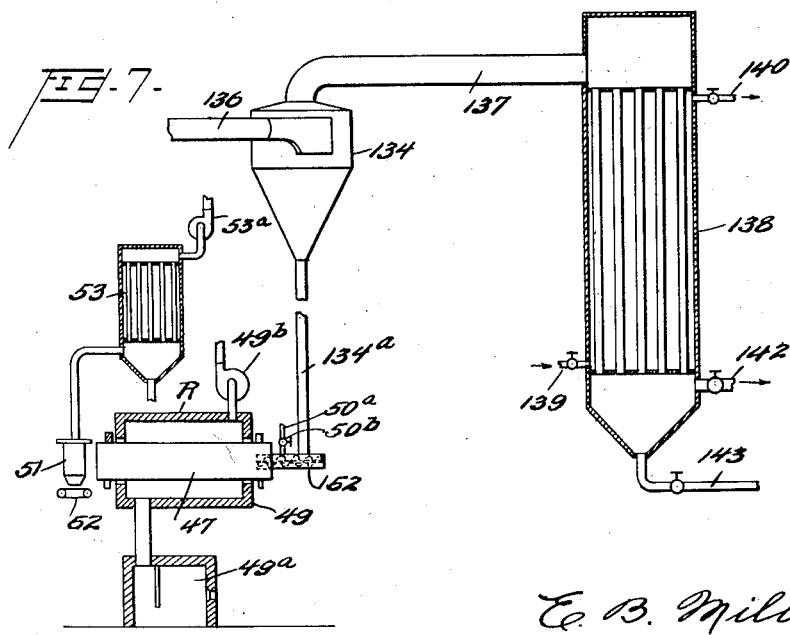
Inventor
E. B. Miller,
By Watson, Coit, Morse & Grindle
Attorney

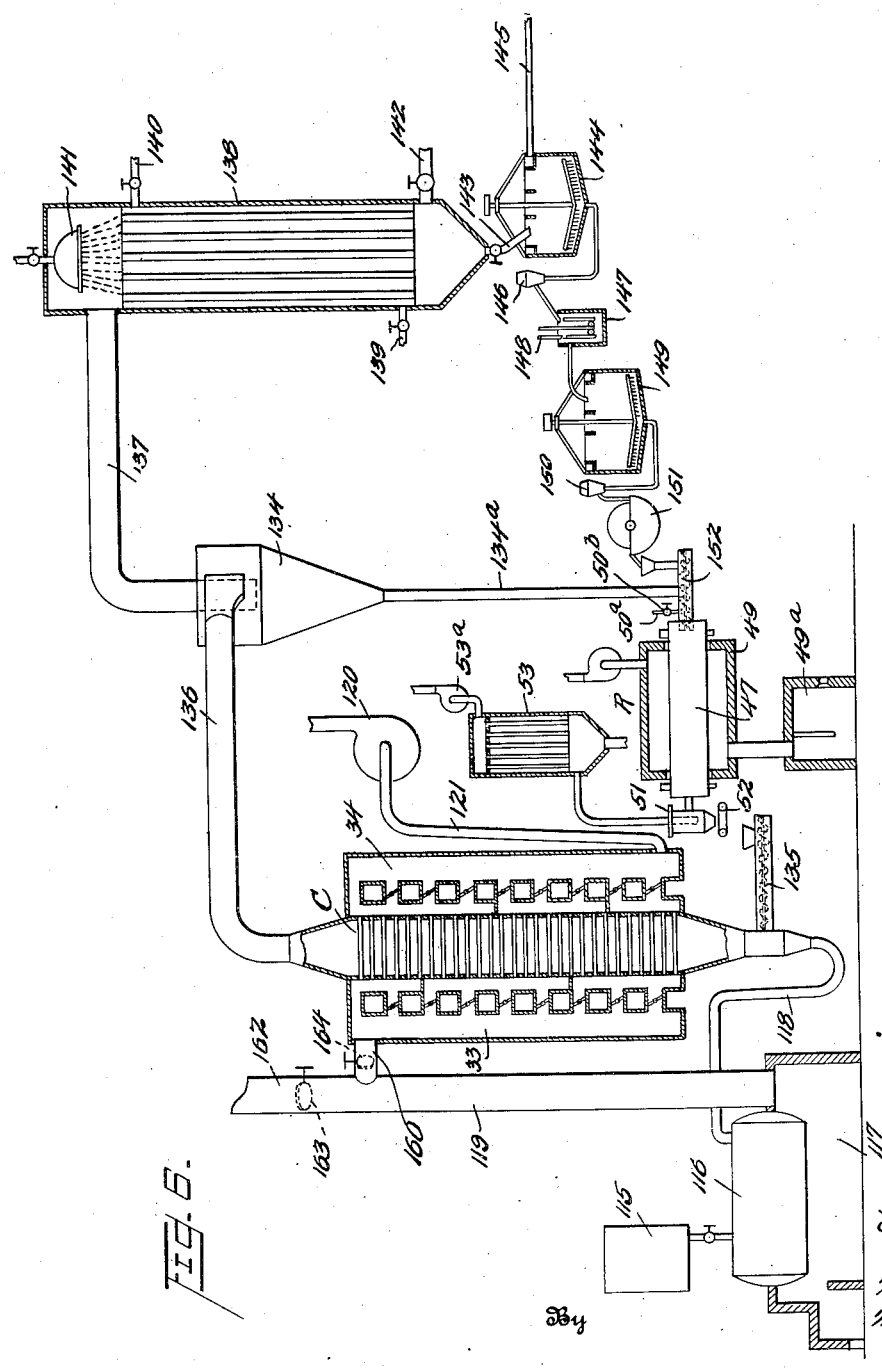

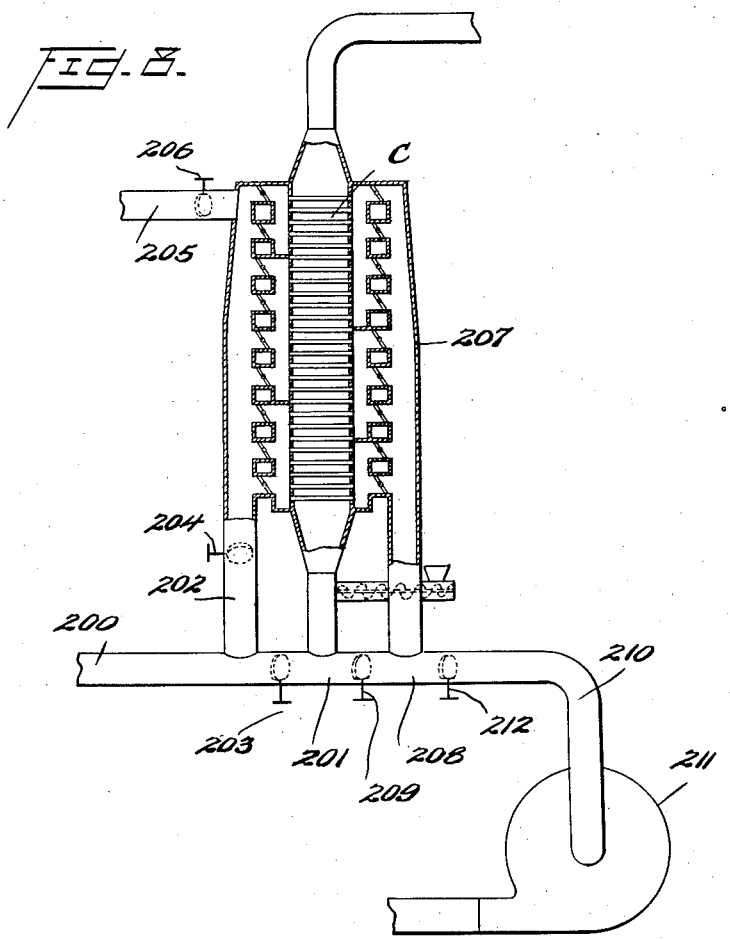

Patented Apr. 7, 1931

1,799,858

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

METHOD FOR CATALYZING GASEOUS REACTIONS

Application filed February 21, 1925. Serial No. 10,836.

The present invention relates to a method and apparatus for catalyzing gaseous reactions.

In most cases where catalysts are employed for the purpose of effecting certain desired contact reactions, the efficiency of the conversion is controlled by several factors, among which are the temperature of the gas while in contact with the catalyst, and the activity of the catalytic mass.

The activity of the catalytic mass is often seriously diminished by the poisonous effect of impurities present in the gas being treated. Consequently, the gas being treated must be carefully cleaned before it comes into contact with the catalyst.

The temperature of the gas at the time of the reaction is an important factor and in most instances should not exceed a certain maximum. This requirement limits the size of converters that can be used. If a certain size is exceeded, the heat of the reaction cannot be dissipated rapidly enough and the temperature of the gas will be raised above the desired point. The converters, therefore, must not be made of a greater size than one in which a sufficient portion of the heat of reaction may be dissipated.

It is the principal object of the present invention to improve prior methods and apparatus for effecting catalytic reactions.

The most important features of novelty of the present process may be listed as follows:

1. Effecting contact between the gas and a solid catalyst, the catalyst being in pulverized form.

2. Separating the solid catalyst from the gas thus treated and returning it for re-use.

3. Treating the catalyst after its separation from the gas and before returning the same for re-use, to remove any poisons or other objectionable substances associated therewith.

4. Securing a very delicate control of the temperature of the gas during the period of conversion.

5. Obtaining the control mentioned in the preceding paragraph by transferring to the incoming stream of gas such portion of the heat of the catalytic reaction as is necessary to maintain the most favorable temperature throughout the converter.

6. Removing or utilizing the heat of the catalytic reaction so that converters of unlimited size may be employed.

7. Eliminating most of the apparatus for cleaning and purifying the gas at present employed before the gas reaches the converter.

8. Employing a relatively small quantity of the catalyst in the system as compared to the quantity necessary with present processes.

For purposes of illustration, the invention will be described in connection with the manufacture of sulphuric acid by the contact process, and cracking petroleum oils. The invention as specifically applied to the sulphuric acid process, however, forms the subject of application Serial No. 318,979, filed November 2, 1928, which is a division of the present application.

The prior contact processes for the manufacture of sulphuric acid are not as economical in practice as theory would lead one to expect, for two reasons, as follows:

1. In the manufacture of commercial sulphuric acid the catalytic mass becomes poisoned by impurities, such as arsenic.

2. Only small converters of eight to ten tons capacity per 24 hours can be employed. If larger converters were used, the temperature of the gas could not be prevented from exceeding the maximum favorable for efficient conversion.

Briefly stated, the invention consists in bringing the gas to be treated in contact with the catalyst, the catalyst being in pulverized form, and then separating the gas and catalyst. If desired, the catalyst may be treated to remove any substances taken up thereby, and the regenerated catalyst returned to be used again. Finally, the gas separated from the catalyst may be treated to obtain the desired product.

Other objects and features of novelty will be apparent from the description taken in connection with the drawings, in which:

Figure 1 is a diagrammatic view of one form of apparatus for effecting catalytic reactions between two or more gases, in accordance with the present invention;

Figure 2 is a similar view, but showing the added feature of means for regenerating the catalyst;

Figure 3 is a diagrammatic view of a contact sulphuric acid plant constructed and arranged to operate in accordance with the present invention;

Figure 4 is a sectional view of the converter taken substantially on the line 4—4 of Figure 3;

Figure 5 is a diagrammatic view of a part of an acid plant showing a modification;

Figure 6 is a diagrammatic view of a petroleum cracking plant constructed and arranged to operate in accordance with the present invention;

Figure 7 is a diagrammatic view of a part of a cracking plant showing a modification; and Figure 8 illustrates a further modification of the plants of Figures 1, 2, 3 and 4.

In the apparatus illustrated in Figure 1, the gas is supplied to the converter C through the pipe 100 at the bottom thereof, it being understood that the converter is any suitable conduit or chamber wherein the gas and the catalyst may come into intimate contact. As shown, the converter is a vertically arranged casing or tube forming a reacting chamber. The catalyst, in pulverized form, is fed into the stream of gas flowing in the pipe 100 in any suitable manner, a worm conveyor 101 being shown for this purpose. The gas and catalyst pass upwardly through the converter and thence by means of a pipe 102 are conveyed to a separator 103. It will be understood that the converter is designed to permit the catalyst and gas to remain in contact for a sufficient length of time for the reaction to take place. Preferably, a converter of a novel type, which will be described hereinafter, is employed, this converter being designed to control the temperature of the gas therein, rapidly and delicately.

In the separator 103, which may be of any desired type, the gas and the catalyst are separated. The separator shown in Figure 1 is of the cyclone type, but, of course, others might be employed, such as the electrical type of precipitators. The gas is withdrawn from separator 103 by a suction fan 104 connected with the discharge pipe 105. It will be understood that this fan effects the circulation of the gas through the entire apparatus.

The catalyst separated out in the separator 103 is conducted by suitable means, as pipe 106, to the hopper 107 which supplies the feed worm 101. In this manner, the catalyst travels in a closed cycle, being used over and over again.

As the catalyst is employed in pulverized form, it has an immense surface and its activity is very much greater than where it is arranged in the form of beds. Furthermore, with an arrangement like the present, wherein the catalyst is used over and over, the total amount of catalyst in the system is much less than required with the processes heretofore employed. In these prior processes, a certain amount of catalyst has been employed per unit of gas being treated. To employ a larger amount of the catalyst would be uneconomical. However, with the present invention, although the total amount of catalyst in the entire system is small, it may be fed into the gas at a rate such that the amount of catalyst used per unit of gas treated is very much greater than heretofore, since the time for the catalyst to travel through the converter, to be separated from the gas and returned to the hopper 107 is very short, being a matter of a few seconds. Because of this fact, a very high efficiency and activity are obtained.

In many cases there are impurities present in the gas which poison the catalyst or have the effect of gradually decreasing its efficiency. It is a well known fact, in many cases of catalytic reactions, that the principal item of cost is due to the expensive treatments required to remove the poisonous substances from the gas to avoid poisoning the catalyst, which however is not entirely accomplished, so that the catalyst must be regenerated from time to time, resulting in the loss of active material. In the present invention the catalyst is continually regenerated, thereby making it unnecessary to clean the gas, it being much cheaper to regenerate the catalyst than clean the gas.

Thus, referring to Figure 2 of the drawings, which is a diagrammatic view like Figure 1, a regenerator R of any suitable type is interposed preferably between the separator and the point at which the catalyst is fed into the stream of gas. The most appropriate regenerative apparatus for the particular problem would be used. Thus, as shown, the catalyst separated out by the separator is delivered to a feed tube 108 which has a feed device, such as a worm conveyor for feeding the catalyst into a rotatably mounted tube 109, disposed in a casing 110 with the ends of the tube projecting from the casing. A furnace 111 is connected to the casing to heat the interior thereof and thereby the tube. The hot gas from the furnace is drawn into the casing and in turn exhausted therefrom by any suitable means, such as a suction fan 112 having its inlet connected with the casing. The catalyst passes through this tube and is heated therein to drive off the objectionable substances and is then conducted by any means, such as tube 113, to the hopper 107 which supplies the feed worm 101. Usually, it is necessary to admit air or some other gas to the interior of the tube to effect the proper treatment of the catalyst.

For his purpose an inlet 114 for the tube is provided and this inlet may be controlled by valve 115.

For the most efficient results, the active material employed must be carried in such a way that a very large contact surface is present. Although the invention is not limited thereto, it is preferred to employ a catalyst wherein silica gel or a substance having substantially the same structure is the carrier for the active material. Thus for oxidizing $SO_2$ to $SO_3$, a platinum impregnated silica gel or a copper-iron impregnated silica gel or other suitable gel might be employed.

Preferably, these gels have ultramicroscopic pores, the size and total volume being such that they will adsorb a vapor such as water vapor to such an extent as to contain in the neighborhood of 21% of their own weight of water when in equilibrium with water vapor at 30° C. and a partial pressure of 22 mm. of mercury.

In the process just described, therefore, the catalytic action is effected by contact between the gas and a solid catalyst, the catalyst being in pulverized form, and traveling in a closed cycle, being used over and over again. Furthermore, before it is returned for re-use, the catalyst is treated to remove objectionable substances, this treatment merely being one of the steps in the closed cycle of movement of the catalyst. A relatively small quantity of catalyst is employed as compared to the quantity necessary with prior processes. Finally, if the converter described hereinafter is used, the temperature of the gas during reaction may be very delicately controlled.

As a further illustration, a contact plant for the manufacture of sulphuric acid, constructed and operated in accordance with the present invention, will now be described.

Referring to Figure 3 of the drawings, the gases to be treated, in the plant shown, are obtained by roasting ores in a roaster 10 of any suitable type. From the roaster the gases pass through a dust catcher 11, of any suitable type, and are delivered to the converter C. If the gases are produced by burning sulphur, then the dust catcher may be eliminated and the gases delivered directly from the burner to the converter C. If desired a cooling device 9, of any suitable type, may be provided to cool the gases before they enter the converter.

The catalyst, in pulverized form, is fed into the stream of gases passing through the converter C and delivered to a separator 13 of any suitable form. In this separator, the catalyst is separated from the gases. The catalyst thus separated passes to a regenerating apparatus R wherein it is treated for the purpose of removing poisons or other substances taken up during the reaction. After this treatment, the catalyst is delivered into the stream of gases entering the converter so that the material is used over and over.

The gases separated out in the separator 13 are delivered to a cooler 14 and then to an absorber 15 wherein the gases come in contact with concentrated sulphuric acid which absorbs the sulphur trioxide.

The sulphuric acid is delivered from the bottom of the absorber to a separator 17 wherein any of the catalytic material, not previously removed, is separated from the sulphuric acid. The sulphuric acid delivered from this separator passes to a cooler 18 and the smaller part is discharged by pipe 19. The greater part, by means of pump 20 is returned to the top of the absorber.

There may be a small amount of catalyst present in the acid delivered by pipe 39, and means is provided to recover this catalyst from the acid and return it to the converter for re-use.

The apparatus will now be described more in detail.

The converter employed is of novel form and is designed so that a delicate control of the temperature of the gases may be had during the period of conversion. With the converters heretofore employed, no entirely satisfactory means have been provided for dissipating the heat of reaction. As a result, converters of limited size only can be employed because, if the maximum size were exceeded, the temperature of the gases would be raised to a point beyond the maximum for efficient reaction. Even with the smaller type present-day converters, the temperature throughout the same is not uniform. In spots, the converter may become far too hot. It is one of the aims of the present invention to provide a converter which will permit regulation of the temperature of the various parts of the converter so that no spots may become excessively hot.

As shown in Figures 3 and 4, the converter comprises a central conduit or chamber 26 having small tubes or pipes 27 extending transversely of the same. These tubes form passages for gases to pass directly from one side of the converter chamber to the other, and may be termed temperature control tubes. Disposed on one side of the chamber or conduit 26 is an inlet or supply pipe 33 and on the opposite side an outlet pipe 34. The inlet pipe 33 is provided with a plurality of small outlets or nozzles 33′ in each of which there is a damper 31. These nozzles 33′ discharge into flues 28 which provide communication between the nozzles and one end of the temperature control tubes 27. In the form shown in Figure 3 of the drawings, there are three of these inlet flues 28.

Similarly, the outlet pipe 34 is provided with a plurality of nozzles 34′, each of which is provided with a damper 32. Flues 29 afford communication between the ends of the temperature control tubes 27 and said nozzles 34'. In the form shown in the drawings, there are three of these flues 29.

It will be seen that the flues 29 on one side of the converter chamber are staggered with respect to the flues 28 on the other side. The purpose for this will presently appear.

In operation, the gases leaving the cooling device 9 flow through conduit 33, any of the nozzles 33' in which the dampers may be open, flues 28, thence through the temperature control tubes 27, flues 29, any of the nozzles 34' that may be open and finally into the pipe 34 which conveys the gases to the central chamber of the converter. The gases, reacting in the chamber 26 of the converter, give out heat, which, by means of the temperature control tubes, is transferred to the gases passing through said tubes.

The design of the converter is such that the cool gases before they are supplied to the converter may be caused to pass back and forth through the temperature control tubes many times, or only once. Furthermore, said gases may be cut off from passing through certain of the tubes. Thus, the temperature of the temperature control tubes may be delicately regulated. If all of the individually controlled dampers 33' and 34' are open, then the gases pass directly from pipe 33 to pipe 34 in the manner described above. With this arrangement of the dampers, the cool gases are in contact with the temperature control tubes for a short time only. Now, if any section of the converter chamber becomes too cold, the temperature control tubes of that section may be cut out as conduits for the cool gases and thus their temperature raised. With another setting of the dampers, the two upper dampers 31 and the two lower dampers 32 might be open, all the remaining dampers being closed. With this setting, the cool gases from the pipe 33 pass through the two upper nozzles 33', the upper flue 28, the upper group of temperature control tubes into the upper flue 29. The dampers 32 being closed, the gases cannot pass into pipe 34 but are caused to pass back through the temperature control tubes into the middle flue 28. The dampers 31 opening into the flue, being closed, the gases again pass through another set of temperature control tubes into the central flue 29, thence to the left through the temperature control tubes into the bottom flue 28, then to the right into the bottom flue 29. As the two lower dampers 32 are open, the gases are now discharged into the pipe 34 and delivered to the converter. Thus, depending on the settings of the dampers, the gases may be caused to pass one or more times through the tubes.

As for this particular phase of the invention, that is, the conversion of sulphur dioxide to sulphur trioxide, the temperature range within which the reaction may be carried out is of no particular importance, inasmuch as the temperatures of such reactions are well known in the art. By way of example, it may be stated that the temperature may vary from 325° C., to 625° C., according to the percentage of conversion from sulphur dioxide to sulphur trioxide desired.

The pulverized catalytic material is fed, by any suitable means, such as the conveyor 35, into the conduit 34 at a point below the tubes 27, so that the reaction takes place while the gases are traveling through the chamber 26 and around the tubes 27. The heat of reaction may be transferred to the gases before they react, by causing them to pass through the tubes 27, the extent of contact of the gases with these tubes being controlled by the setting of the dampers 31 and 32 as described above. Thus, the heat of reaction is utilized for heating the gases supplied to the converter, and being dissipated in this way there is no limit to the size of the converter that may be employed, as far as the dissipation of heat is concerned.

The catalyst employed, preferably, is of the type described hereinbefore. For oxidizing sulphur dioxide to sulphur trioxide, platinized silica gel, iron silica gel or copper-iron silica gel are preferred.

Although, as stated, gels, or materials having a porous structure like gels, are preferred for the present invention, it is to be distinctly understood that the invention is not limited to these materials but includes others that may be used for effecting catalytic reactions in the manner set forth in this specification.

The mixture of gases and pulverized catalyst is conveyed by a pipe 36 to the separator 13, which in the drawings is illustrated as a cyclone separator, where the catalytic agent is separated and drops to the regenerating apparatus R. On the other hand, the gases separated out by means of the separator 13 are conducted by conduit 37 to any suitable form of cooler 14 and after passing through this cooler, the gases are delivered by means of a conduit 38 to the absorber 15. In the absorber, the sulphur trioxide passing vertically up through the same is met by concentrated sulphuric acid falling through the tower for the purpose of absorbing the gaseous sulphur trioxide and thereby increasing the concentration of the sulphuric acid.

The flow of gases through the apparatus just described from the ore roaster to the exit of the absorber may be effected in any suitable manner, but as shown the suction fan 16 is connected to the gas outlet of the absorber 15 and effects the movement of the gases through the entire apparatus.

The sulphuric acid is conveyed from the bottom of the absorber by a pipe 39 to a separator 17 of any suitable type. In this separator, any of the catalytic agent that has been carried along by the gases is separated from the sulphuric acid. The sulphuric acid, by a pipe 40, overflows from the separator and is delivered to a cooler 18 and the final product is discharged by pipe 19. Part of the cooled sulphuric acid by means of pump 20 is returned to a reservoir 41 at the top of the absorber, this acid being used to percolate down through the absorber, or the acid may be returned from the bottom of the absorber to the top thereof without passing through a separator, and a small quantity of the acid may be taken from the bottom of the absorber and delivered to the separator 17. Water is also supplied to this reservoir 41 to reduce the concentration of the acid to the desired point. The catalytic material separated out in the separator 17 is conveyed to an agitator 21 through a pipe 42, movement being effected by a pump, indicated diagrammatically at 43. Water is supplied to the agitator so that the sulphuric acid is diluted making it possible to handle the catalyst without damaging subsequent apparatus.

The mixture is discharged from the agitator 21 by means of a pipe 44 to another separator 22. The liquid separated out in this separator is discharged by pipe 23 and the recovered catalytic material, by means of pipe 45 and a pump 46, is delivered to a filter 24 of any suitable type, such as an Oliver filter. The dried catalytic material delivered from this filter is conveyed by any suitable means to the regenerating apparatus R. As shown, an elevator 25 is employed for this purpose.

The apparatus 17, 43, 45, 24, 25, etc., is employed to recover any of the catalytic agent that may not have been separated by the separator 13. Usually, however, the separator 13 is so efficient that practically no catalytic material passes along with the gases in conduit 37, so that said apparatus may be omitted, as shown in Figure 5. Here the sulphuric acid passes from the absorber 15 directly through pipe 39 to the cooler 18, and parts 40, 17, 42, 43, 21, 22, 23, 45, 46, 24 and 25 of Figure 3 are omitted.

The regenerating apparatus R consists of any suitable means for subjecting the catalytic material to heat or other treatment that will remove poisons or any other substances associated with the same. As shown, a tube 47 is rotatively mounted in a housing 49. This tube is heated in any suitable manner, as by hot gases surrounding the tube and supplied from a furnace 49ª, circulation being effected by a suction fan 49ᵇ. The catalytic material is fed into one end of the tube by any suitable means, such as a worm conveyor 50 and is delivered at the other end into a chamber 51. This chamber has an outlet for delivering the regenerated catalytic agent to the worm conveyor 35. If desired, a magnetic separator 52 may be interposed between the chamber 51 and the worm conveyor 35 for the purpose of removing any magnetic iron oxide that may be present with the catalytic agent.

A dust collector 53, of any suitable type, is adapted to recover any dust present in the chamber 51, a suction fan 53ª being connected with the dust collector to effect circulation.

In treating the catalyst in the regenerator, it is often necessary to provide oxygen to burn off substances associated therewith, and for this purpose an air inlet 50ª is provided which may be associated with the worm conveyor 50, said inlet being controlled by a valve 50ᵇ.

It is to be distinctly understood that the application of the invention to a contact sulphuric acid plant is described merely by way of illustrating one form of the invention. The invention is not limited to sulphuric acid plants but may be employed for effecting other catalytic reactions, such as the synthesis of ammonia, the hydrogenation of oils, the cracking of heavy petroleum oils into gasoline, and many other similar reactions depending on contact phenomena.

The apparatus for hydrogenating oils in accordance with the present method might be like that diagrammatically illustrated in Figure 2 of the drawings. The catalyst used, preferably, would be a nickel silica gel. The catalyst in the usual methods becomes poisoned with nickel carbonyl. According to the present invention, however, this poison is removed in the regenerative apparatus where, if necessary, hydrogen instead of air may be supplied through the inlet 114.

The apparatus for applying the present invention to cracking of heavy petroleum oils into gasoline might be also that illustrated in Figure 2 of the drawings except that the petroleum product in the gas phase would be fed to the converter. Preferably, the catalyst employed is iron oxide silica gel, but silica gel with other catalysts might be used, or iron gels and the like. In prior methods, the efficiency of the catalyst is reduced by carbon forming thereon. According to the present invention, however, this carbon is burned off in the regenerative apparatus so that the catalyst is returned for re-use with its full efficiency and activity.

In order that the method and apparatus for cracking petroleum oils according to this invention may be fully understood, reference may be had to Figure 6 of the drawings. As shown therein, the heavy oil is fed from a reservoir 115 into a closed retort 116 and subjected to heat from any suitable source as from the furnace 117. The oil in the retort 116 is thus vaporized, and by means of pipe 118, the vapors are conducted to the entrance of the converter C which is substantially like that already described, the only difference being that the vapors to be acted on by the catalyst are not passed back and forth across the reacting chamber prior to entry into the converter. In cracking oils, the action is endothermic, and so it is necessary to supply heat instead of abstract it, as where $SO_2$ is oxidized to $SO_3$. For this purpose, as shown, the products of combustion from the furnace 117 by means of pipes 119 and 160 are conducted to the inlet pipe 33. Valves 163 and 164 may be provided in pipes 160 and 119 respectively. The outlet pipe 34 is in communication with an exhaust fan 120 through pipe 121. Thus the fan 120 effects the circulation of the gases across the chamber of the converter.

The pulverized solid catalyst, which is preferably a suitable gel, is fed by means of a worm conveyor 135 into the stream of vapors entering the converter. While passing through the converter, the catalyst effects the desired cracking of the petroleum oil, the temperature of the reaction being controlled by the circulation of the hot gases across the chamber of the converter, in the manner described in connection with the sulphuric acid apparatus of Figure 3. The temperature of the converter is necessarily maintained at any point within a considerable range, the exact temperature at any time being entirely dependent upon the character of oil being treated and the products desired. The temperature may vary between 700° F. and 1150° F.

The vapors leaving the converter are conducted by means of a conduit 136 to a separator 134 wherein the catalyst is separated from the vapors, the latter being conducted by pipe 137 to a condenser 138. This condenser may be of any suitable type, and as shown, is supplied with cooling water at the water inlet 139, the exit for this water being shown at 140. A water spray 141 is provided at the upper end of the condenser. This water is supplied for the purpose of washing the condenser tubes clear of any of the catalyst not separated out by the separator 134. The gases which are not condensed in the condenser may be discharged through the outlet 142. The condensate is conveyed by pipe 143 to a separator 144 which is shown in the form of a Dorr thickener. In this separator any catalyst that may not have been segregated by the separator 134 collects at the bottom of the thickener. The product of the apparatus is delivered through pipe 145. The catalyst from the thickener 144 is delivered to a pump 146 which discharges into an agitator 147 supplied with hot water through pipe 148. The recovered catalyst is thus agitated with the hot water and is then delivered into another separator, shown as a Dorr thickener, 149. The hot water acts to displace any of the petroleum oil that may be in the pores of the catalyst. A pump 150 takes the catalyst from the separator 149 and delivers it to a filter such as an Oliver filter 151 which discharges into a conveyor or other means 152 for feeding the catalyst into an activator. The catalyst separated out by the separator 134, by means of pipe 134ª, is also delivered to said conveyor 152. The activator or regenerating apparatus R is the same as illustrated for the sulphuric acid plant and needs no further description.

Usually the separating means 134 is so efficient that practically no catalyst is carried along with the final product. Usually, therefore, the discharge 143 of the condenser is also the discharge for the final product, that is to say, the parts 141 and 144 to 151 inclusive of Figure 6 may usually be omitted. Figure 7 illustrates an apparatus wherein these parts have been omitted.

In connection with the plants shown in Figures 1, 2 and 3, it may be desirable to have a separate source of supply of cooling gases. As shown in Figure 8, the gas supply pipe 200 may deliver the gases through a pipe 201 directly to the converter or through pipe 202 to the temperature control tubes of the converter. These two pipes are supplied with valves 203 and 204 respectively for controlling the flow. Both the valve 204 and pipe 202 may be provided with an air inlet 205 controlled by valve 206. The outlet pipe 207 for the cooling gases is connected by pipe 208 with the inlet of the converter, flow in this pipe 208 being controlled by a valve 209. The outlet pipe 207 is also in communication, through pipe 210, with an exhaust fan 211, flow in this pipe 210 being controlled by a valve 212.

In the operation of this modification of the invention, when it is desired to employ air for cooling the converter, the valves 203, 206 and 212 are opened and valves 204 and 209 closed. Then the exhaust fan 211 will draw air in through the air inlet 205 and this air will be circulated through the temperature control tubes and exhausted through fan 211. The reactant gases will flow through pipe 201 to the inlet of the converter. When it is desired to use all of the reactant gases as the cooling medium, then valves 203, 206 and 212 are closed and valves 204 and 209 opened. The apparatus will then operate as explained in connection with Figures 1, 2 and 3. Except as described above, the structure of the converter is the same as illustrated in Figures 3 and 4.

In the claims and specification the term "gas" is intended to describe the physical state of the substance being treated and to include a single gas or vapor and a mixture of gases and (or) vapors.

Although various embodiments of the invention have been described in detail, it is to be understood that the invention is not limited to these forms, but includes modifications and changes which come within the scope of the appended claims.

Having thus described the invention what is claimed as new and desired to be secured by Letters Patent is:

1. The method of effecting catalyzable gaseous reactions, consisting in feeding into a stream of the gas heated to reaction temperature, a pulverized catalyst capable of effecting the desired reaction, whereby the catalyst is carried along in suspension in the gas, passing fluid transversely of said stream at a plurality of points along said stream, optionally cutting off said transverse flow at selected points and effecting said flow at others, whereby a variable heat exchange is accomplished, and thereafter separating the catalyst from the gas.

2. The method of effecting catalyzable gaseous reactions, consisting in feeding into a stream of the gas, a pulverized catalyst comprising silica gel having associated therewith an active material capable of effecting the desired reaction, whereby the catalyst is carried along in suspension in the gas and thereafter separating the catalyst from the gas.

3. The method of effecting catalyzable gaseous reactions, consisting in feeding into a stream of the gas, a pulverized catalyst comprising silica gel having associated therewith an active material capable of effecting the desired reaction, whereby the catalyst is carried along in suspension in the gas, separating the catalyst from the gas, treating the catalyst to remove any poisonous or objectionable substances associated therewith, and returning it to be again fed into the stream of gas, the catalyst thus moving in an endless cycle.

4. The method of effecting catalyzable gaseous reactions, consisting in feeding into a stream of the gas, a pulverized catalyst comprising silica gel having associated therewith an active material capable of effecting the desired reaction, whereby the catalyst is carried along in suspension in the gas, separating the catalyst from the gas, heating the catalyst to remove any poisonous or objectionable substances associated therewith, and returning it to be again fed into the stream of gas, the catalyst thus moving in an endless cycle.

5. The method of cracking petroleum oils, consisting in vaporizing the oil, effecting a flow of said vapor, feeding into the stream of vapor a catalyst consisting of silica gel having associated therewith an active material capable of effecting the desired reaction, passing the vapor with the catalyst in suspension through a zone maintained at the cracking temperature, separating the vapor and catalyst, treating the catalyst to remove any poisonous or objectionable substances associated therewith, and returning it to treat a fresh supply of vapor, the catalyst thus moving in an endless cycle.

6. The method of cracking petroleum oils, consisting in vaporizing the oil, effecting a flow of said vapor, feeding into the stream of vapor a pulverized catalyst consisting of silica gel having associated therewith active material capable of effecting the desired reaction, passing vapor with the catalyst in suspension through a zone maintained at a reaction temperature, then separating the catalyst from the vapor and returning the catalyst to be again fed into the stream of vapor.

7. The method of cracking petroleum oils, consisting in vaporizing the oil, effecting a flow of said vapor, feeding into the stream of vapor a pulverized catalyst consisting of silica gel containing iron, passing the vapor with the catalyst in suspension through a zone maintained at a reaction temperature, then separating the catalyst from the vapor and returning the catalyst to be again fed into the stream of vapor.

8. The method of cracking petroleum oils, consisting in bringing into contact at a cracking temperature the oil in vapor phase and a pulverized solid catalyst consisting of silica gel impregnated with a substance containing iron, and thereafter separating the vapor and catalyst.

9. The method of cracking petroleum oils, consisting in vaporizing the oil, effecting a flow of said vapor, feeding into the stream of vapor a pulverized catalyst capable of effecting the desired reaction, passing the vapor with the catalyst in suspension through a zone maintained at a reaction temperature, then separating the catalyst from the vapor, returning the catalyst to be again fed into the stream of vapor, recovering said vapor separated from said catalyst and treating the recovered vapor to separate any of the catalyst that may be present therein and returning this portion of the catalyst for re-use.

10. The method of cracking petroleum oils, consisting in vaporizing the oil, effecting a flow of said vapor, feeding into said vapor a pulverized solid catalyst capable of effecting the desired reaction, passing the vapor with the catalyst in suspension through a zone maintained at a reaction temperature, then separating the vapor and catalyst, treating the catalyst to remove any poisonous or objectionable substances associated therewith, returning the catalyst to treat a fresh supply of vapor, condensing said vapor separated from the catalyst, separating from said condensate any catalyst that may be present and returning the same for re-use.

11. The method of effecting catalyzable gaseous reactions, consisting in feeding into a stream of the gas maintained at reaction temperature, a catalyst consisting of a porous material, having associated therewith an active substance capable of effecting the desired reaction, said material having pores of such size that it will adsorb water vapor to such an extent as to contain about 21% of its own weight of water when in equilibrium with water vapor at 30° C. and a partial pressure of 22 mm. of mercury, whereby the catalyst is carried along in suspension in the gas, and thereafter separating the material and the gas.

12. The method of cracking petroleum oils consisting in vaporizing the oil, effecting a flow of said vapor through a reaction zone, feeding into the stream of vapor prior to its entry into the reaction zone, a pulverized material capable of effecting the desired reaction, said material having pores of such size that it will adsorb water vapor to such an extent as to contain about 21% of its own weight of water when in equilibrium with water vapor at 30° C. and a partial pressure of 22 mm. of mercury, maintaining the reaction zone at a cracking temperature and then separating the vapor and the porous material.

13. The method of cracking petroleum oils consisting in vaporizing the oil, effecting a flow of said vapor through a reaction zone, feeding into the stream of vapor prior to its entry into the reaction zone a catalyst consisting of a porous material having associated therewith an active substance capable of effecting the desired reaction, said material having pores of such size that it will adsorb water vapor to such an extent as to contain about 21% of its own weight of water when in equilibrium with water vapor at 30° C. and a partial pressure of 22 mm. of mercury, maintaining the reaction zone at a cracking temperature and then separating the vapor and the catalyst.

14. The method according to claim 13, modified in that the porous material contains iron.

15. The method of refining hydrocarbon oils by effecting a chemical reaction in said oils, which comprises vaporizing the oil, effecting a flow of said vapor, feeding into the stream of vapor a pulverized solid adsorbent material having pores of such size that it will absorb water vapor to such an extent as to contain about 21% of its own weight of water when in equilibrium with water vapor at 30° C. and a partial pressure of 22 mm. of mercury, passing the vapor with the adsorbent material therein through a zone maintained at a suitable reaction temperature and thereafter separating the refined oil and the adsorbent material.

16. The method of effecting catalyzable gaseous reactions, consisting in feeding into a stream of gas flowing through a suitable reaction chamber a pulverized catalyst capable of effecting the desired reaction, whereby the catalyst is carried along in suspension in said gas, passing said gas prior to its introduction into said reaction chamber transversely of said stream at one or more points, varying the amount of flow of said gas at said points in accordance with the temperature conditions desired, whereby a variable heat exchange may be effected between said stream of gas flowing through said chamber and said transversely flowing gas throughout the length of said chamber or at selected points therein.

In testimony whereof I hereunto affix my signature.

ERNEST B. MILLER.